United States Patent [19]

Billet et al.

[11] 4,399,897
[45] Aug. 23, 1983

[54] DIAPHRAGM CLUTCH MECHANISM

[75] Inventors: Rene Billet, Lamorlaye; Michel Bacher, Garges-les-Gonesse, both of France

[73] Assignee: Valeo, Paris, France

[21] Appl. No.: 160,460

[22] Filed: Jun. 18, 1980

[30] Foreign Application Priority Data

Jun. 25, 1979 [FR] France ................ 79 16226

[51] Int. Cl.³ .............................. F16D 13/36
[52] U.S. Cl. .................................. 192/89 B
[58] Field of Search ............ 192/89 B, 98, 89 QT

[56] References Cited

U.S. PATENT DOCUMENTS

| 3,630,333 | 12/1971 | Schiefer | 192/89 B |
| 3,978,955 | 9/1976 | Nagano | 192/89 B |
| 4,084,674 | 4/1978 | De Gennes | 192/89 B |
| 4,273,228 | 6/1981 | Huber | 192/89 B |

FOREIGN PATENT DOCUMENTS

| 1217703 | 5/1966 | Fed. Rep. of Germany | 192/89 B |
| 2205454 | 8/1973 | Fed. Rep. of Germany | |
| 1165998 | 10/1969 | United Kingdom. | |
| 1195952 | 6/1970 | United Kingdom. | |

Primary Examiner—George H. Krizmanich
Attorney, Agent, or Firm—Young & Thompson

[57] ABSTRACT

A diaphragm clutch mechanism for a motor vehicle has a diaphragm spring disposed between a primary fulcrum support provided on the cover and a secondary fulcrum support retained by fastening means which fasten the diaphragm to the cover for rocking movement between the two supports.

The fastening means comprise lugs extending from the cover, each having an axial portion passing through openings in the diaphragm, and an outwardly turned radial portion, said portions defining between them a wedging bend. An annular support ring forms (directly or indirectly) the secondary fulcrum support and this is wedged in position by the folding of the radial portions of the lugs beween the wedging bend and a thrust bearing surface formed on the axial portion of each lug. A clearance is provided between the fulcrum supports and the diaphragm so that the diaphragm is not gripped by the supports, and clamping friction is thereby avoided.

15 Claims, 22 Drawing Figures

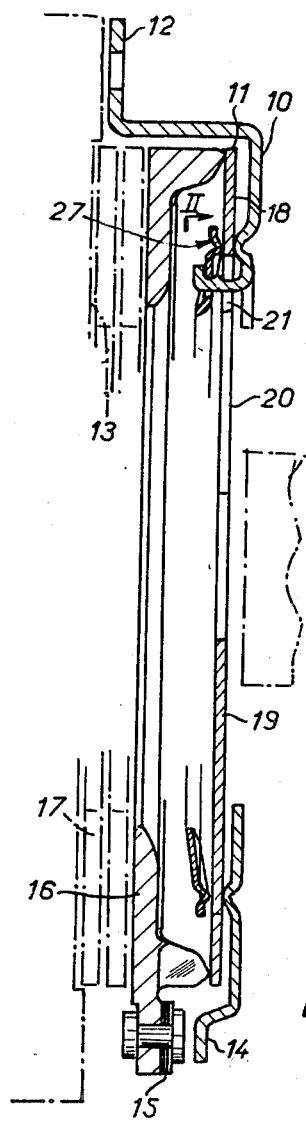
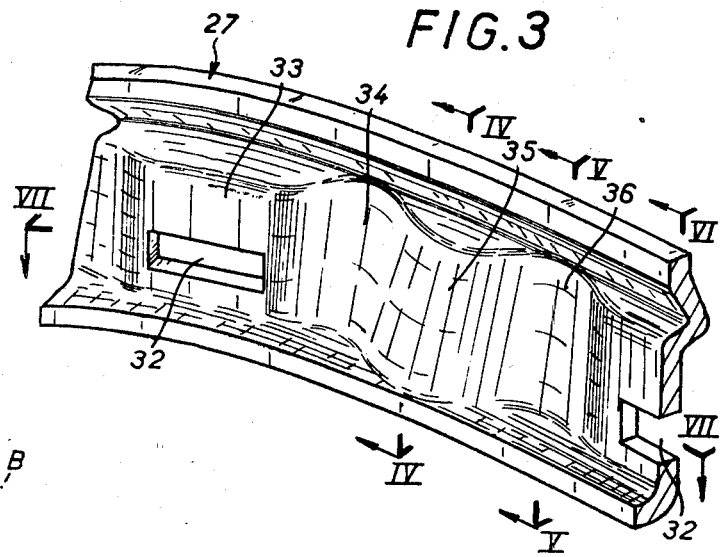
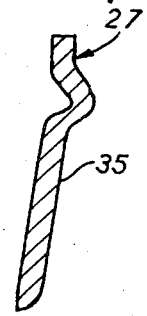
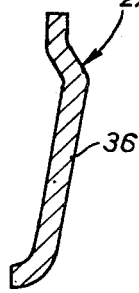
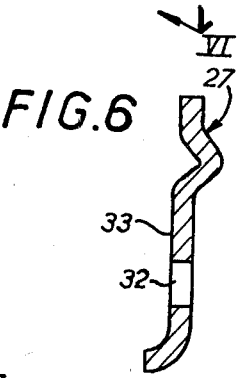
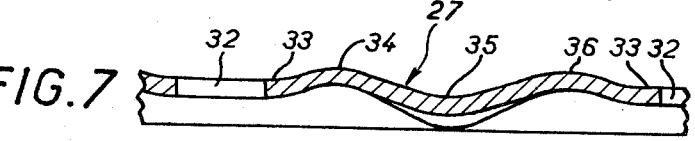
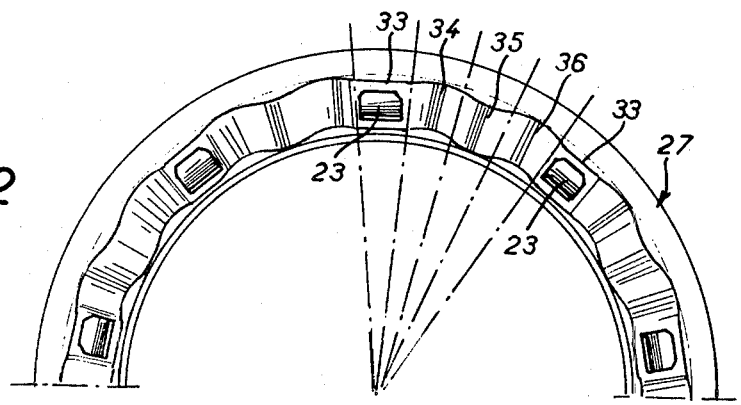

DIAPHRAGM CLUTCH MECHANISM

BACKGROUND OF THE INVENTION

The present invention relates to a diaphragm clutch mechanism, particularly for a motor vehicle, of the kind comprising a first generally annular part known as the cover adapted to be peripherally attached to a first plate known as the reaction plate or flywheel, and also to be rotationally fixed to a second plate known as the pressure plate; a second generally annular part known as the diaphragm and comprising a peripheral portion forming a Belleville spring for acting on the pressure plate and a central portion divided into radial fingers for acting on a clutch release bearing; and connection means fastening the diaphragm to the cover and comprising flat, thin lugs extending from the cover and having an axial portion and a radial portion, which portions define between them a wedging bend, and an annular supporting ring wedged in the bend, the cover and the ring defining directly or indirectly, for the diaphragm, a primary fulcrum support and a secondary fulcrum support, these supports being disposed substantially opposite one another.

As a rule in clutch mechanisms of this type the supporting ring is elastic and axially applies the diaphragm against the primary support of the cover with a predetermined elastic clamping load which may be of any suitable value higher or lower than or substantially equal to the clutch release force, this being the force that is applied by means of the clutch release bearing to the diaphragm in order to disengage the clutch.

Clutch mechanisms of this type may perform satisfactorily. Nevertheless, they have the disadvantage that, however low the abovementioned elastic clamping load is, considerable friction is introduced at the primary and secondary supports between which the diaphragm is gripped.

A main object of the present invention is to provide a diaphragm clutch mechanism, particularly for a motor vehicle, which possesses all the advantages inherent in mechanisms of the kind described above, but which is free from this disadvantage.

SUMMARY

According to the invention, a diaphragm clutch mechanism of the above kind is characterised in that slight play is provided between the primary and secondary supports and the diaphragm, and in that the annular support ring is embedded between the wedging bend and a bearing surface or projection solid with the aforesaid axial portion of the said lugs.

As the result of this arrangement the secondary fulcrum support has substantial rigidity, even when the support ring is relatively thin.

According to another characteristic of the invention, the rigidity thus imparted to the support ring is increased by ribbing the support ring and/or by extending the support ring by the provision of an annular heel part extending towards the axis of the clutch.

The projection on the axial portion of the lugs of the crown is effected by stamping, by means of a cut-out tongue, or in any other fashion, for example with the aid of shoulders providing a support similar to a mortise and tenon joint.

When the mechanism is built up, the various parts are first assembled in relation to one another in the position of rest and before the radial portions of the lugs have been bent over, i.e. while they are still in line with the axial portions of the lugs. They are so assembled that a preliminary play greater than the final predetermined play is provided between the diaphragm and the primary and secondary supports, the support ring being in contact with the projections on the lugs. That part of each lug which is to form the radial portion is then folded so as to clamp the support ring between the wedging bend thus formed and the projection. A clamp is then applied to the support ring in the direction of the diaphragm to reduce the play to its final value by buckling the lugs of the cover at a rounded zone of the latter lying between the primary support of the cover and the axial portion of the lugs.

BRIEF DESCRIPTION OF THE DRAWINGS

FIG. 1 is a view in axial section of a diaphragm clutch mechanism according to the invention;

FIG. 2 is a partial view of the diaphragm support ring of this mechanism, in elevation in the direction of the arrows II—II in FIG. 1;

FIG. 3 is a partial view in perspective, on a larger scale, of this support ring, showing its ribbing;

FIGS. 4, 5 and 6 are views in corresponding radial sections on the lines IV—IV, V—V, and VI—VI of FIG. 3;

FIG. 7 is a view of the support ring in circumferential section on the line VII—VII in FIG. 3;

DESCRIPTION OF THE PREFERRED EMBODIMENTS

Figure 8:
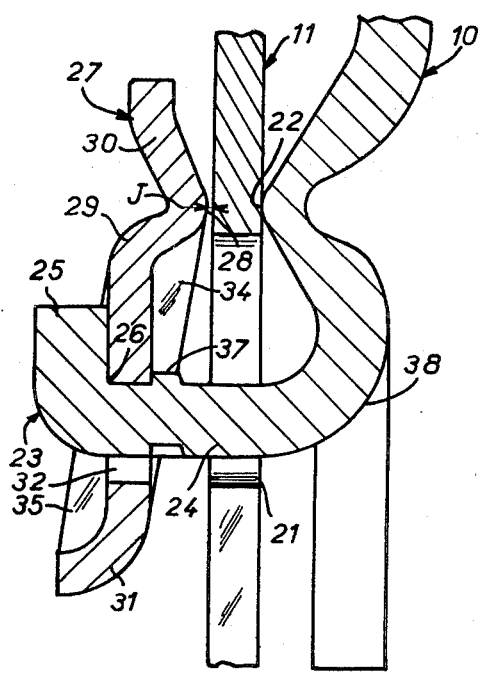
FIG. 8 is a view on a still larger scale of a detail of FIG. 1, the mechanism being in the position of engagement of the clutch.
Figure 9:
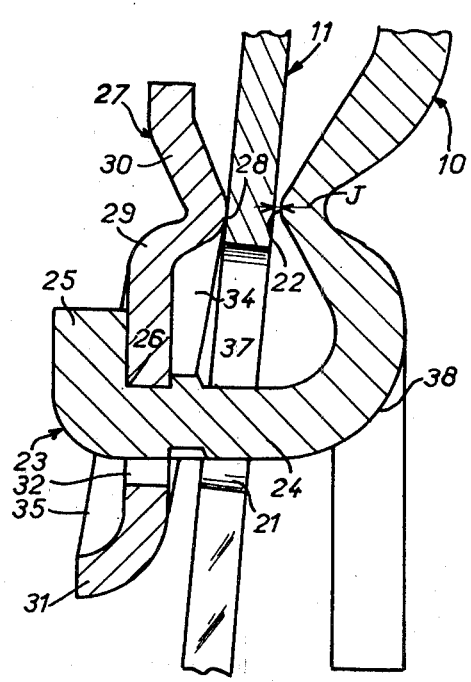
FIG. 9 is the same view as FIG. 8, but shows the mechanism in the disengaged position of the clutch.

Reference will first be made to FIGS. 1 to 9, in which a diaphragm clutch mechanism for a motor vehicle comprises a first generally annular part 10 known as the cover and a second generally annular part 11 known as the diaphragm.

On its periphery the cover 10 has a first series of coplanar areas 12 by which it can be fixed to a first plate 13 known as the reaction plate or flywheel, and a second series of coplanar areas 14 axially set back in relation to the first series of areas and enabling it to be coupled by tangential tongues 15 to a second plate 16, known as the pressure plate.

The tongues 15 rotationally fasten the plate 16 to the cover 10 and allow the plate 16 sufficient axial mobility to ensure that under the action of the diaphragm 11 a friction disc 16 interposed between the plates 13 and 16 can be gripped between the said plates.

The diaphragm 11 has a peripheral portion 18 forming an elastic washer of the Belleville spring type for acting on the pressure plate 16.

The diaphragm 11 also has a central portion divided into radial fingers 19 separated by slots 20 originating from passages 21 provided between the fingers 19 in the zone in which the said fingers are joined to the peripheral portion of the diaphragm 11 forming the Belleville spring 18.

A movable control member in the form of a clutch release bearing B, is adapted to act on the radially innermost ends of these radial fingers 19.

Assembly means are provided for fastening the diaphragm 11 to the cover 10 for pivotal or rocking movement with respect thereto. The diaphragm 11 cooperates with a primary circular fulcrum support 22, which in the example illustrated is formed by a dished portion of the cover 10.

In the example illustrated in FIGS. 1 to 9, these assembly means comprise a circular series of spaced fastening members 23 integral with the cover 10 and each having an axial portion 24 passing through passages 21 formed in the diaphragm 11, and a radial portion 25 extending towards the periphery of the mechanism, these portions 24 and 25 defining between them a wedging bend 26. The radial portion 25 is formed at the end of the members 23.

More particularly, these members 23 are composed of relatively flat, thin lugs extending directly from the cover 10 and integral therewith, from which they are suitably cut out and appropriately folded.

The assembly means further comprise an inner diaphragm support ring 27 defining for the diaphragm 11 a secondary fulcrum support 28 disposed substantially opposite the primary fulcrum support 22 formed by the dished portion of the cover 10. The supports 22 and 28 are disposed on a larger radius than the axial portion 24. In the example illustrated in FIGS. 1 to 9, the cover 10 and the support ring 27 form the supports 22 and 28 for the diaphragm 11 directly, but they could form these supports indirectly, for example with the aid of one or more intermediate parts.

In the example illustrated in FIGS. 1 to 9, the support ring 27 has a cross-section resembling a very open V with a main flange 29 extending towards the periphery of the mechanism between the wedging bend 26 and the secondary support 28, and an auxiliary flange 30 which is shorter than the main flange and which forms an extension of the latter in the direction of the periphery of the mechanism. The support ring 27 has in addition a heel part 31 which forms an extension of it in the direction of the axis of the mechanism, beyond the axial portion 24. This heel 31 has an incurved shape, as can be seen in FIG. 3. In a position corresponding to each lug 23 the support ring 27 has a passage 32 intended to allow the axial portion 24 to pass through.

In addition, the support ring 27 is ribbed so as to provide substantial rigidity despite its small thickness. The ribbing of the support ring 27 can be seen clearly in FIGS. 2 to 7. The support ring 27 comprises in succession, circumferentially, a plane portion 33 in which a passage 32 is formed, then a boss 34 which is convex in the direction of the diaphragm 11, then a boss 35 which is concave in the direction of the diaphragm 11, then a boss 36 which is convex in the direction of the diaphragm 11, and then once again a plane portion 33, and so on.

Furthermore, the axial portion 24 of each lug 23 has an axially-directed thrust bearing surface which in the example shown in FIGS. 1 to 9 comprises a projection 37 formed by stamping. The projection 37 is such that the support ring 27 is locked between the wedging bend 26 and this projection 37.

This locking action imparts great rigidity and strength to the support ring 27 enabling the bearing surface 28 to be perfectly solid and resistant even if the spport ring 27 is relatively thin. This rigidity is further increased by the ribbing 33, 34, 35 and 36 and by the heel part 31.

In the final assembled position of the mechanism, a small predetermined clearance J is provided between the primary support 22 and the secondary support 28 and the diaphragm 11. To give some idea, this play J is of the order of one tenth of a millimeter.

For assembly purposes the cover 10 is placed with the lugs 23 only partially folded, that is to say with the portions 25 in line with the axial portions 24.

The diaphragm 11 and its support ring 27 are threaded onto these lugs. The diaphragm 11 rests on the primary support 22 and the support ring 27 rests on the projections 37. A preliminary play, which is substantially greater than the play J, for example ten times as great, (i.e. of the order of one millimeter), is then present between the secondary support 28 and the diaphragm 11. The portion 25 of the lugs 23 is then folded so that it extends radially, which has the effect of locking the support ring 27 between the wedging bend 26 thus formed and the projections 37. At this moment the preliminary play of the order of one millimeter still exists between the secondary support 28 and the diaphragm 11.

A clamp is applied over the entire face of the support ring 27 on the opposite side to the diaphragm 11. With the aid of this clamp the support ring 27 is brought closer to the diaphragm 11 in order to reduce the play to its final value J, by bringing about a deformation by the buckling of the lugs 23 of the cover 10. This deformation is applied to a rounded portion 38 which lies between the primary support 22 and the axial portion 24 of the lugs 23. Assembly is then complete. The support ring 28 is in the locked condition and by its bearing surface 28 provides the small play J in relation to the diaphragm 11. This bearing surface 28 is extremely strong because of the rigidity of the support ring due to its locked condition at 26, 37 and to its ribbing at 33, 34, 35, 36, as well as to the heel 31, even if the support ring 27 is relatively thin.

In the position of clutch engagement the mechanism occupies the position shown in FIG. 8. When the clutch release bearing B acts on the fingers 19 of the diaphragm 11 for the purpose of disengaging the clutch, the diaphragm 11 is displaced from the position shown in FIG. 8 to that shown in FIG. 9, and in the course of this displacement the diaphragm 11 passes from a position abutting the primary support 22 to a position abutting the secondary support 28, the play J permitting the diaphragm 11 to be inclined freely without any friction clamping at the supports 22 and 28.

Figure 10:
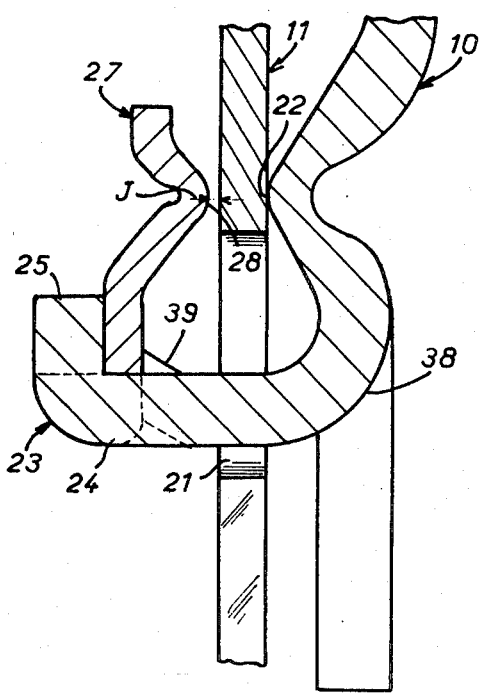
FIG. 10 is a similar view to FIG. 8, but relates to a modified embodiment.
Figure 11:
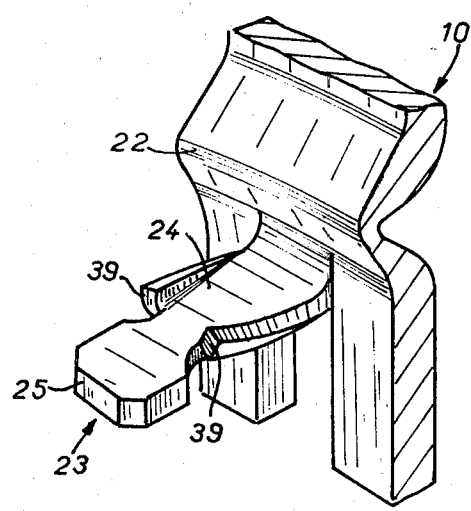
FIG. 11 is a partial view in perspective of the cover in this modified embodiment, and shows one of the lugs of this cover before the folding of its radial portion.

Reference will now be made to FIGS. 10 and 11, in which the arrangement is similar to that just described with reference to FIGS. 1 to 9, but in which the projection on the axial portion 24 of the lugs 23 is produced, not by a stamping 37, but by raised edges 39 of the axial portion 24.

Figure 12:
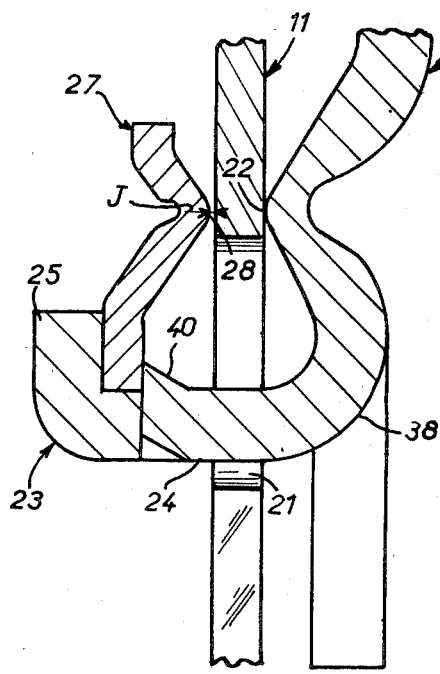
FIG. 12 is a similar view to FIG. 8 or FIG. 10, but relates to another modified embodiment.
Figure 13:
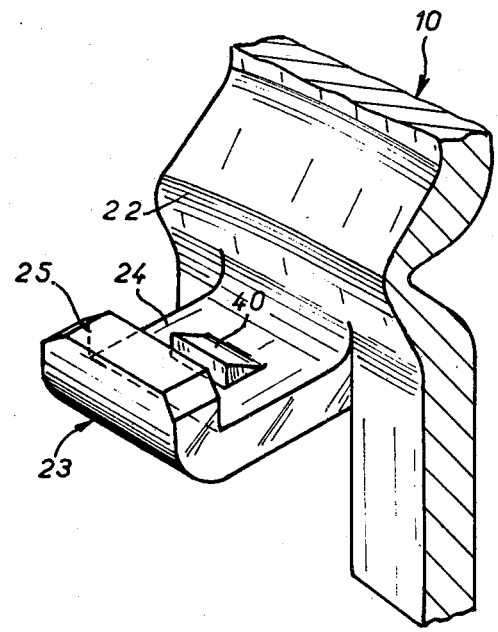
FIG. 13 is a partial view in perspective of the cover shown in FIG. 12, and shows one of the lugs of this cover after the folding of its radial portion.

In another modified embodiment (FIGS. 12 and 13), the projection on the axial portion 24 of the lugs 23 is formed by a cut-out tongue 40 on the respective lug 24.

Figure 14:
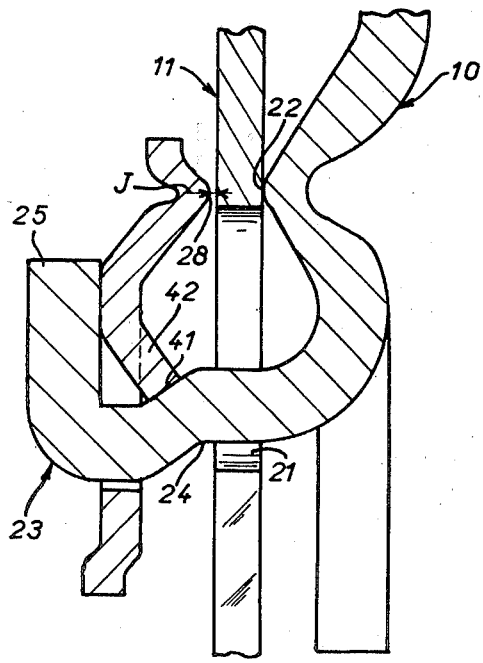
FIG. 14 is a similar view to FIG. 8 or FIG. 10 or FIG. 12, and relates to another modified embodiment.
Figure 15:
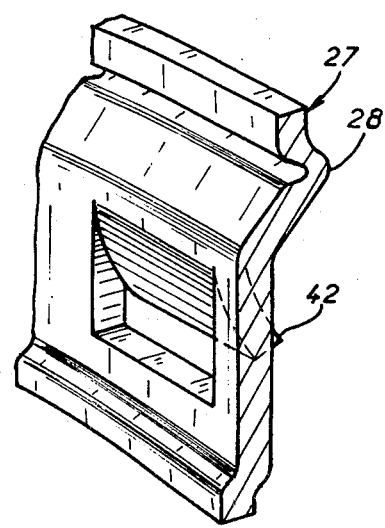
FIG. 15 is a partial view in perspective of the support ring shown in FIG. 14.

In another modified embodiment (FIGS. 14 and 15) the projection is formed by an inclined face 41 of the axial portion 24, against which inclined face a tongue 42 cut out from the support ring 27 bears.

Figure 16:
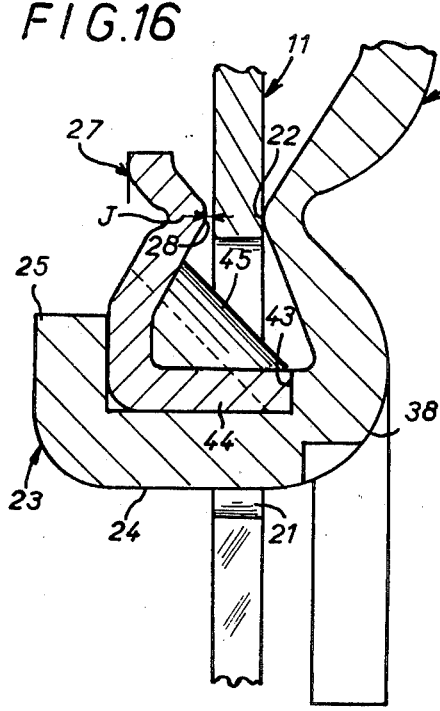
FIG. 16 is a similar view to FIG. 8 or FIG. 10 or FIG. 12 or FIG. 14, but relates to another modified embodiment.
Figure 17:
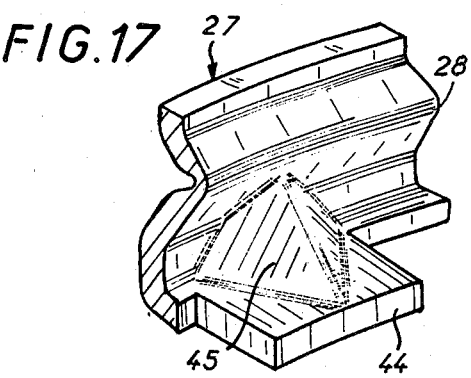
FIGS. 17 and 18 are views in perspective, in three-quarter front and three-quarter rear views respectively, of the support ring shown in FIG. 16.
Figure 18:
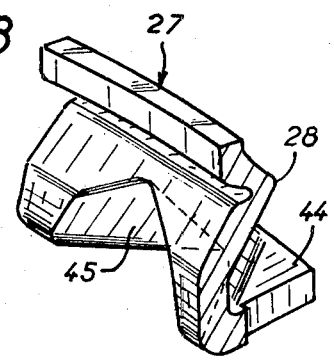

In another embodiment (FIGS. 16 to 18) the projection on the axial portion 24 of the lugs 23 is formed by a groove 43 in the said portion 24, which groove forms a support for a foot 44 integral with the support ring 27 and joined to the latter by a gusset 45 of dihedral shape.

In an alternative embodiment (FIGS. 19 and 20) the projection on the axial portion 24 of the lugs is formed by a shoulder 46 on the portion 24, against which shoulder the support ring 27 abuts, with a connection similar to a mortise and tenon joint. Here again the support ring 27 is clamped in position between the wedging bend 26 and the shoulder 46.

Figure 19:
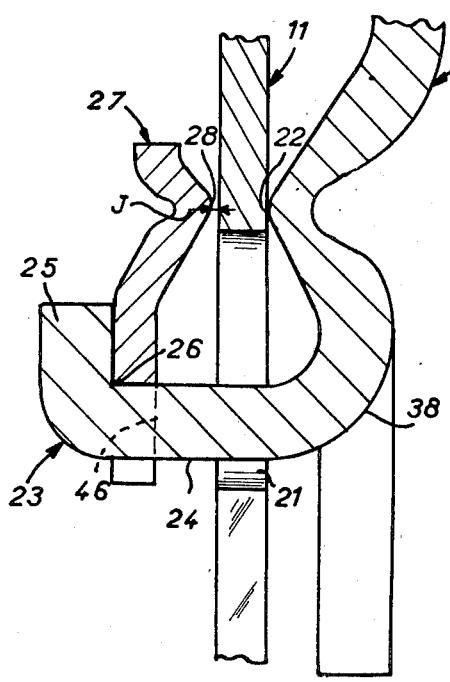
FIG. 19 is a similar view to FIG. 8, FIG. 10, FIG. 12, FIG. 14, or FIG. 16, but relates to another modified embodiment.
Figure 20:
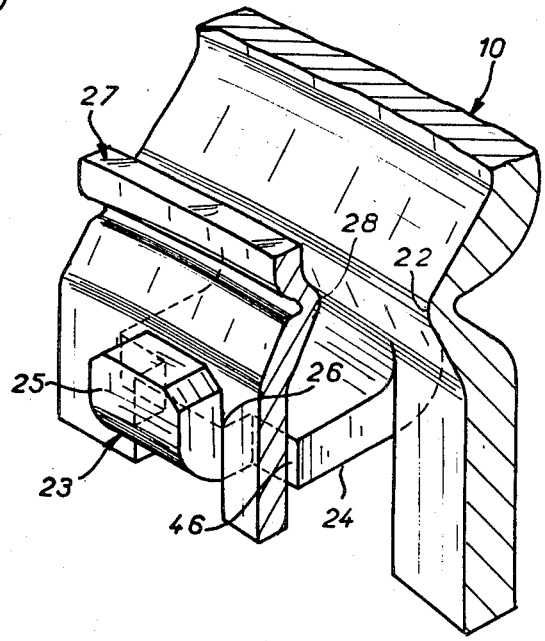
FIG. 20 is a partial view in perspective of the cover and support ring shown in FIG. 19, and shows one of the lugs of the cover and the engagement of the support ring on this lug.
Figure 21:
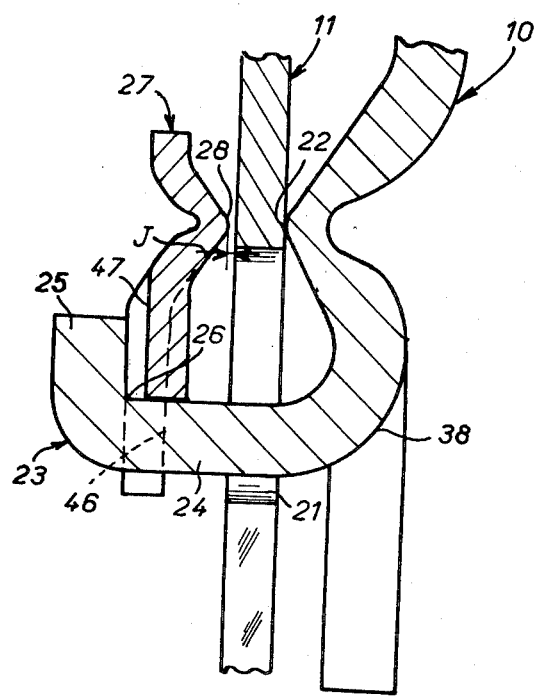
FIG. 21 is a similar view to those of FIG. 8, 10, 12, 14, 16 or 19, but relates to yet another modified embodiment.
Figure 22:
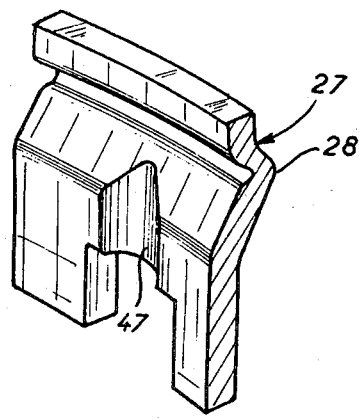
FIG. 22 is a partial view in perspective of the support ring shown in FIG. 21 and shows an indented region of this ring in a position corresponding to one of the lugs of the cover.

In yet another modified embodiment (FIGS. 21 and 22) the arrangement is similar to that just described with reference to FIGS. 19 and 20, and at 46 it is possible to recognise the shoulder on the axial portion 24 of the lugs 23 against which the support ring 27 abuts, with a connection similar to a mortise and tenon joint, thus bringing about the clamping of the support ring 27 between the wedging bend 26 and the shoulder 46 but here the support ring 27 has indented regions 47 in positions corresponding to the lugs 23, for the purpose of increasing the effectiveness of the secondary support 28.

The invention is not restricted to the embodiments described and illustrated, but embraces all variants within the scope of the appended claims. In particular, the primary fulcrum support of the cover may be formed by a dished portion, as illustrated, or by other means such as an open or closed ring engaged in a groove formed in the cover. The same applies to the secondary fulcrum support.

In the examples illustrated the fastening members extending from the cover pass through holes in the diaphragm, but they may be arranged in any other appropriate way. The bearing surfaces may be formed on some or all of the lugs.

We claim:

1. A diaphragm clutch cover assembly for a motor vehicle, of the kind comprising a generally annular cover member adapted to be peripherally attached to a reaction plate, and intended to be rotationally fast with a pressure plate; a diaphragm comprising a Belleville spring having a peripheral portion acting on the pressure plate and a central portion divided into radial fingers for cooperating with a clutch release bearing; and connection means fastening the diaphragm to the cover for rocking movement with respect thereto, said connection means comprising relatively thin, flat lugs extending from the cover, each having an axial portion and a radial portion, which portions define between them a bend, said axial portion having a circumferential extent substantially greater than its radial thickness, and a diaphragm support ring engaging said bend, the cover and the support ring defining, for the diaphragm, a primary fulcrum support and a secondary fulcrum support respectively which supports are disposed substantially opposite one another, there being play between the supports and the diaphragm, and the axial portion of the lugs having a thrust bearing surface against which the support ring is applied, while the radial portion of each lug is formed by a part of the lug which is folded radially outwardly of the plane of the axial portion of the lug about a chordal bend line parallel to the plane of the axial portion of the lug in such a manner as to clamp the support ring means between the said abutment surface and the bend.

2. A diaphragm clutch mechanism according to claim 1, wherein the aforesaid thrust bearing surface of the axial portion of the lugs consists of a radial projection on the axial portion of the lugs.

3. A diaphragm clutch mechanism according to claim 2, wherein the said projection is formed by stamping of the axial portion of the lugs.

4. A diaphragm clutch mechanism according to claim 2, wherein the said projection is composed of raised edge means on the axial portion of the lugs.

5. A diaphragm clutch mechanism according to claim 2, wherein the said projection is composed of a tongue cut out from the axial portion of the lugs.

6. A diaphragm clutch mechanism according to claim 2, wherein the said projection is formed by an inclined face on the axial portion of the lugs, and a tongue cut out from the support ring cooperates with said inclined face.

7. A diaphragm clutch mechanism according to claim 2, wherein the said projection is formed by a groove formed in the axial portion of the lugs, and a foot integral with the support ring is engaged with said groove.

8. A diaphragm clutch mechanism according to claim 1, wherein said foot is connected to the support ring by a dihedral gusset.

9. A diaphragm clutch mechanism according to claim 1, wherein the said thrust bearing surface comprises a shoulder formed on the axial portion of the lugs, and the support ring is provided with cut-outs which cooperate with respective shoulders in the manner of a mortise and tenon joint.

10. A diaphragm clutch mechanism according to claim 9, wherein the support ring is formed with indented regions in positions corresponding to said lugs.

11. A diaphragm clutch mechanism according to claim 1, wherein the support ring is provided with stiffening means.

12. A diaphragm clutch mechanism according to claim 11, wherein said stiffening means comprise the ribbing of the support ring.

13. A diaphragm clutch mechanism according to claim 12, wherein said ribbing comprises in succession circumferentially, a plane portion, a convex boss part, a concave boss part, a convex boss part, a plane portion, and so on.

14. A diaphragm clutch mechanism according to claim 11, wherein said stiffening means comprise an annular extension of the support ring extending radially inwardly towards the axis of the mechanism, being formed in this extension through which the axial portions of the lugs pass.

15. A diaphragm clutch for a motor vehicle, comprising a generally annular cover member adapted to be attached to a reaction plate; a pressure plate rotationally fast with the cover member; a diaphragm comprising a Belleville spring having a peripheral portion acting on the pressure plate and a central portion divided into radial fingers for cooperating with a clutch release bearing; and connection means fastening the diaphragm to the cover for rocking movement with respect thereto, said connection means comprising relatively thin, flat lugs extending from the cover, each having an axial portion and a radial portion, which portions define between them a bend, said axial portion having a circumferential extent substantially greater than its radial thickness, and a diaphragm support ring engaging said bend, the cover and the support ring defining, for the diaphragm, a primary fulcrum support and a secondary fulcrum support respectively which supports are disposed substantially opposite one another, there being play between the supports and the diaphragm, and the axial portion of the lugs having a thrust bearing surface against which the support ring is applied, while the radial portion of each lug is formed by a part of the lug which is folded radially outwardly of the plane of the axial portion of the lug about a chordal bend line parallel to the plane of the axial portion of the lug in such a manner as to clamp the support ring means between the said abutment surface and the bend.

* * * * *